United States Patent [19]

Myerhoff

[11] 4,431,714

[45] Feb. 14, 1984

[54] FUEL CELL DESIGN AND ASSEMBLY

[75] Inventor: Alfred Myerhoff, Greensburg, Pa.

[73] Assignee: The United States of America as represented by the United States Department of Energy, Washington, D.C.

[21] Appl. No.: 394,071

[22] Filed: Jul. 1, 1982

[51] Int. Cl.³ .............................................. H01M 8/02
[52] U.S. Cl. ........................................ 429/26; 429/37
[58] Field of Search ..................... 429/26, 37, 38, 39

[56] References Cited

U.S. PATENT DOCUMENTS

| | | | |
|---|---|---|---|
| 2,419,270 | 4/1947 | Linnartz | 144/301 |
| 2,682,694 | 7/1954 | Kempkes | 24/263 |
| 2,949,947 | 8/1960 | Story | 144/303 |
| 3,321,334 | 5/1967 | Palmer | 136/86 |
| 4,114,260 | 9/1978 | DiGiacomo et al. | 29/623.1 |
| 4,171,564 | 10/1979 | Acton et al. | 29/623.2 |
| 4,186,165 | 11/1979 | Adlhart | 429/30 |
| 4,186,246 | 1/1980 | Sugalski | 429/60 |
| 4,203,202 | 5/1980 | Esaian et al. | 29/623.2 |
| 4,233,369 | 11/1980 | Breault et al. | 429/26 |
| 4,233,371 | 11/1980 | Korrestinjn | 429/152 |
| 4,324,344 | 4/1982 | Kothmann | 429/26 |

Primary Examiner—Donald L. Walton
Attorney, Agent, or Firm—Michael F. Esposito

[57] ABSTRACT

The present invention is directed to a novel bipolar cooling plate, fuel cell design and method of assembly of fuel cells. The bipolar cooling plate used in the fuel cell design and method of assembly has discrete opposite edge and means carried by the plate defining a plurality of channels extending along the surface of the plate toward the opposite edges. At least one edge of the channels terminates short of the edge of the plate defining a recess for receiving a fastener.

20 Claims, 5 Drawing Figures

FUEL CELL DESIGN AND ASSEMBLY

The U.S. Government has rights in the present invention pursuant to Contract No. DEN3-161 between the Westinghouse Electric Corporation and NASA.

BACKGROUND OF THE INVENTION

The present invention is directed to a novel bipolar cooling plate, fuel cell design and assembly. In particular, the present invention is directed to a fuel cell design which enables pretesting of a short stack of fuel cells (i.e., building blocks) prior to assembly into a tall multi-cell fuel cell stack. This novel design makes dismantling of the tall multi-cell fuel cell stacks easier and safer.

Fuel cells can be extremely advantageous as power sources, particularly for certain applications, such as a primary source of power in remote areas with limited access to convential power sources. It is of course necessary in these instances that the power system not only be self contained, but extremely reliable.

In the past, various fuel cell designs have been devised to accomplish these purposes. A typical fuel cell is comprised of a matrix material for holding electrolyte and an electrode disposed on each side of the matrix and in contact therewith. Reactant gases are fed to the non-electrolyte side of each electrode. In a stack of fuel cells gas impervious separator plates are disposed between adjacent cells. The cells convert the reactants, such as hydrogen and air (i.e. $O_2$) into D.C. electrical power in a manner well known in the art. The electrochemical reaction produces, as a by-product, waste heat which must be removed in a controlled manner to maintain the cells at the desired operating temperature. For the most efficient operation it is desirable to maintain all cells at a uniform temperature and at a maximum level consistent with material compatability characteristics.

In current practice, tall stacks of many individual fuel cells connected in series are formed to produce a cell having a practical voltage. For example, the voltage of a single fuel cell is usually in the order of a half volt. Accordingly, if 200 one-half volt cells are piled into a stack the electric potential of the stack would be approximately 100 volts.

In assembling the tall fuel cell stack individual cells are formed first. Each individual cell resembles a sandwich structure comprising a bipolar plate, an anode, a matrix and a cathode. The individual cells are piled up, and the stack is compressed by an externally applied load to assure intimate electrical contact of the components and gas tight sealing of the surfaces. This compression is an essential part of the assembly procedure. Once the fuel cell stack is compressed, phosphoric acid (electrolyte) can be added to the dry matrices without fear that the acid will leak out from the layers of the sandwich structure. The fuel cell stack becomes functional only after the acid is added. That is, the cell is now capable of generating electric current provided an appropriate fuel such as $H_2$ and $O_2$ is passed through the cell interior.

While the above described assembly procedure appears good in theory, there are many practical manufacturing problems associated with it. The major problem is that the tall fuel stack can only be tested after it has been assembled and filled with acid. The likelihood of each individual cell of the stack performing within the specified limit is extremely poor. Accordingly, in the case of a failure, as for example an open circuit, the stack must be dismantled and the faulty cell removed and replaced. Obviously, this is a hazardous and cumbersome procedure because the cells are now filled with concentrated phosphoric acid. In addition, the reassembly of the stack is just as dangerous and difficult with no guarantee that everything will be functioning after reassembly. Accordingly, a second or third iteration may be required before the stack performs as specified. Finally, other problems can develop once the stack is in operation. For example, seals separating the fuel from the oxygen or phosphoric acid from the gas reactant can develop leaks. If this occurs, dismantling and reassembly is again required.

From the aforementioned discussion, it is readily apparent that there is a need to pretest the fuel cells prior to assembly into tall stacks. This pretesting would eliminate malfunctioning cells prior to final assembly. It is with this object in mind that the novel fuel cell design and assembly of the present invention have been developed.

SUMMARY OF THE INVENTION

It is the primary object of the present invention to provide a novel bipolar cooling plate.

It is another object of the present invention to provide a novel fuel plate assembly which can be readily dismantled.

It is still another object of the present invention to provide a novel method for pretesting intermediate fuel cell stacks (i.e. building blocks) prior to their final assembly into a tall multi-cell fuel cell stack.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein the bipolar cooling plate of the present invention has discrete opposite edges, and means carried by the plate defining a plurality of channels extending along the surface of the plate toward the opposite edges. At least one edge of the channels terminates short of the corresponding edge of the plate defining a recess for receiving a fastener.

In a preferred embodiment of the present invention, both ends of the channel extending along the surface of the plate terminate short of the corresponding edges of the plate to define recesses for receiving removable fasteners.

In a further preferred embodiment of the present invention, the recesses are formed in stair-step configurations and the channels comprise U-shaped grooves extending along the surface of the plate. As a result the reactant gases can pass through the channels with the fastener in place during the pre-test phase.

In a still preferred embodiment of the present invention the recesses are arranged substantially perpendicular to the channels.

In accordance with another aspect of the present invention, as embodied and broadly described herein, the fuel cell assembly of the present invention comprises a plurality of single fuel cells arranged in a stack, the stack having a top and bottom face and juxtapositioned with the top and bottom faces are corresponding upper and lower bipolar cooling plates. The upper and lower cooling plates have discrete opposite edges, and means carried by the plates defining a plurality of channels extending along the surface of the plates toward the opposite edges. At least one end of the channels terminates short of the corresponding edge of the plate defining a recess for receiving a fastener.

In a preferred embodiment of this aspect of the present invention both ends of the channels terminate short of the corresponding edges of the plate defining recesses for receiving fasteners.

In a further preferred embodiment of the present invention, the recesses have a stair step configuration and are arranged perpendicular to the channels extending along the surface of the plates.

In a still further preferred embodiment of the present invention, the channels comprise U-shaped grooves extending along the surface of the plate.

In accordance with an additional aspect of the present invention as embodied and broadly described herein, the method of assembly and pretesting the fuel cell stack of the present invention comprises locating a plurality of fuel cells between an upper and lower bipolar cooling plate to form a short stack (i.e., building block). The upper and lower cooling plate having discrete opposite edges and means carried by the plates defining a plurality of channels extending along the surface of the plates toward the opposite edges. At least one end of the channels terminates short of the corresponding edge of the plates defining a recess for receiving a fastener. A fastener is attached to the upper and lower cooling plates at the corresponding edge to compress the stack. Electrolyte is introduced into the compressed stack to activate the fuel cell stack, and the stack is electrically tested to insure proper operating parameters have been achieved.

In a preferred embodiment of the method of the present invention the electrolyte is applied to the matrix layer prior to assembling the other components in a short stack. This will speed up the process because it normally takes several days for the electrolyte to migrate (seep) through the thin matrix. In addition, applying electrolyte prior to assembly enables visual verification that the entire matrix has been wetted.

In another preferred embodiment the method of the present invention further comprises machining at least one exposed edge of the short fuel cell stack to provide a substantially planer surface on at least one edge of the fuel cell stack. The machining may be performed prior or subsequent to the introduction of the electrolyte into the compressed stack.

In a further preferred embodiment, the method of the present invention further includes assembling a plurality of said compressed short fuel stacks including fasteners with the upper cooling plate of one stack in contact with the bottom cooling plate of the adjacent stack forming an electrically connected tall fuel cell stack.

In a still further preferred embodiment, the method of the present invention comprises applying pressure to the plurality of the compressed short fuel cell stack by a means independent of the fasteners, and, subsequently, removing the fasteners from the compressed fuel cell stack.

The advantages of the present invention in comparison to the above-described procedures is that the bipolar cooling plate of the present invention enables temporary compression of a short fuel cell stack, and pretesting of this compressed short stack takes place prior to final assembly of the fuel cells into a completed tall fuel cell stack. Accordingly, any defects in the individual short stacks are detected prior to final assembly which substantially reduces the handling and cumbersome dismantling involved in disassembly of a completed tall fuel cell stack.

BRIEF DESCRIPTION OF THE DRAWINGS

The accompanying drawings, which are incorporated in and form a part of the specification, illustrate an embodiment of the present invention, and together with the description serve to explain the principles of the invention.

In the drawings.

Reference will now be made in detail to the present preferred embodiment of the invention, an example of which is illustrated in the accompanying drawings.

DETAILED DESCRIPTION OF THE DRAWINGS

Figure 1:
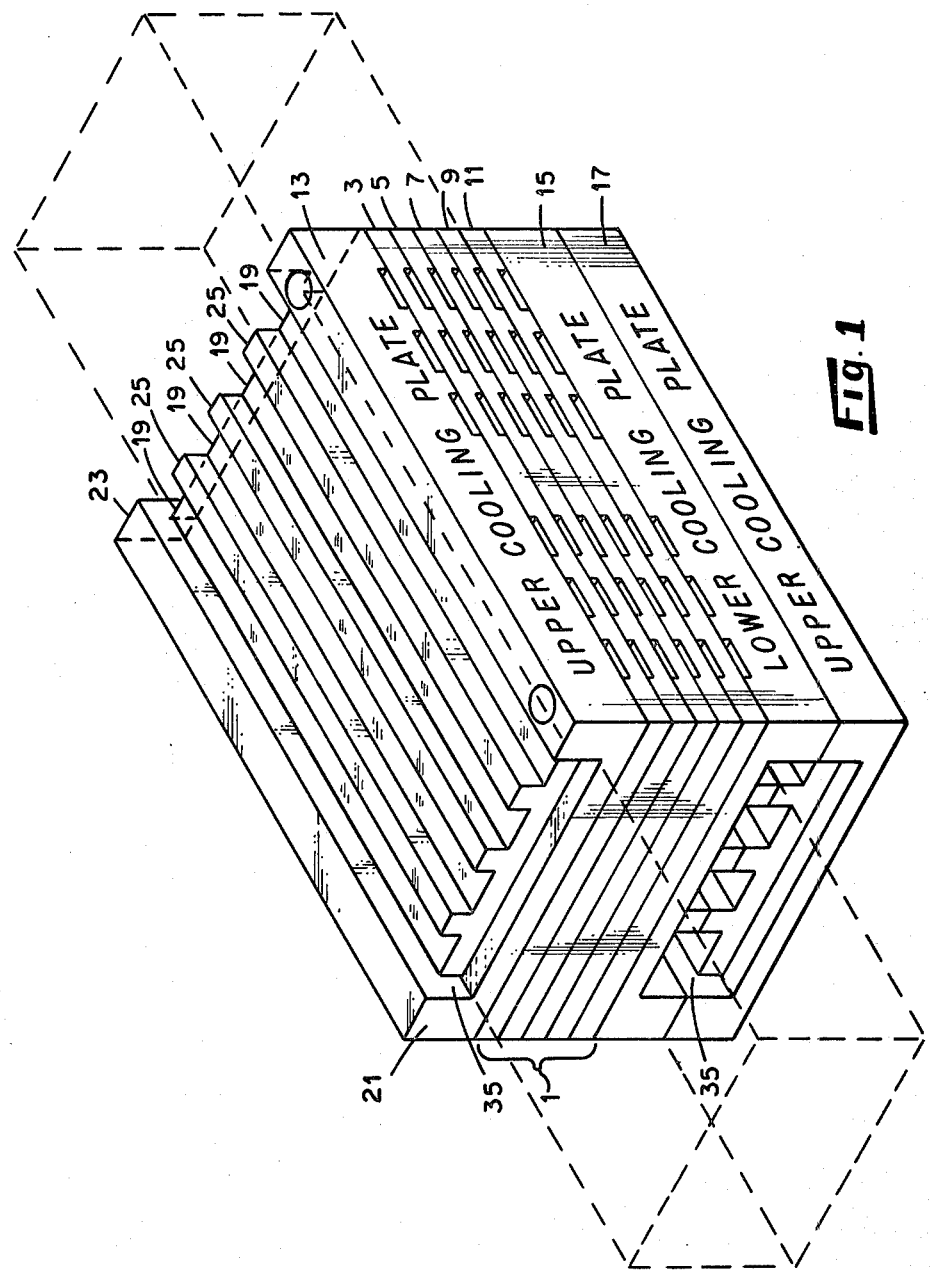
FIG. 1 is a perspective view of a single assembled short fuel cell stack having upper and lower cooling plate members.

For purposes of illustration, the short fuel stack (i.e., building block) 1 depicted in FIG. 1 comprises a five cell stack. It should be understood that for purposes of this invention, the principles involved are applicable to any number of individual cells in stack 1.

Five cell stack (building block) 1 is shown in FIG. 1. Stack 1 comprises five fuel cells, 3, 5, 7, 9 and 11, respectively, located between upper bipolar cooling plate 13 and lower bipolar cooling plate 15. An additional upper bipolar cooling plate 17 abutting the lower bipolar cooling plate, illustrates the beginning of another five cell stack located below the one depicted in the Figure.

Upper and lower bipolar cooling plates 13 and 15 are hybrids by nature. That is, the external surfaces (i.e., surfaces abutting another bipolar cooling plate) carry a means for passage of cooling gases. The internal surface of these bipolar cooling plates are provided with a fuel gas means (not shown) running in a direction opposite to cooling gas means 25.

Upper and lower bipolar cooling plates 13 and 15 have discrete opposite edges 21 and 23, respectively. Means 25 are carried by the plate defining a plurality of channels 19 extending along the surface of plates 13 and 15 toward edges 21 and 23, at least one end of channels 19 terminates short of corresponding edge 21 or 23 to define a recess 35 for receiving a fastener. Recess 35 forms a stair-step configuration with respect to means 25. In FIG. 1 both ends of channels 19 terminate short of edges 21 and 23, respectively, defining two recesses 35 (emphasized by dashed lines extended from them). The dashed lines indicate where fasteners (not shown in FIG. 1) are located to temporarily compress fuel cell stack 1.

Figure 2:
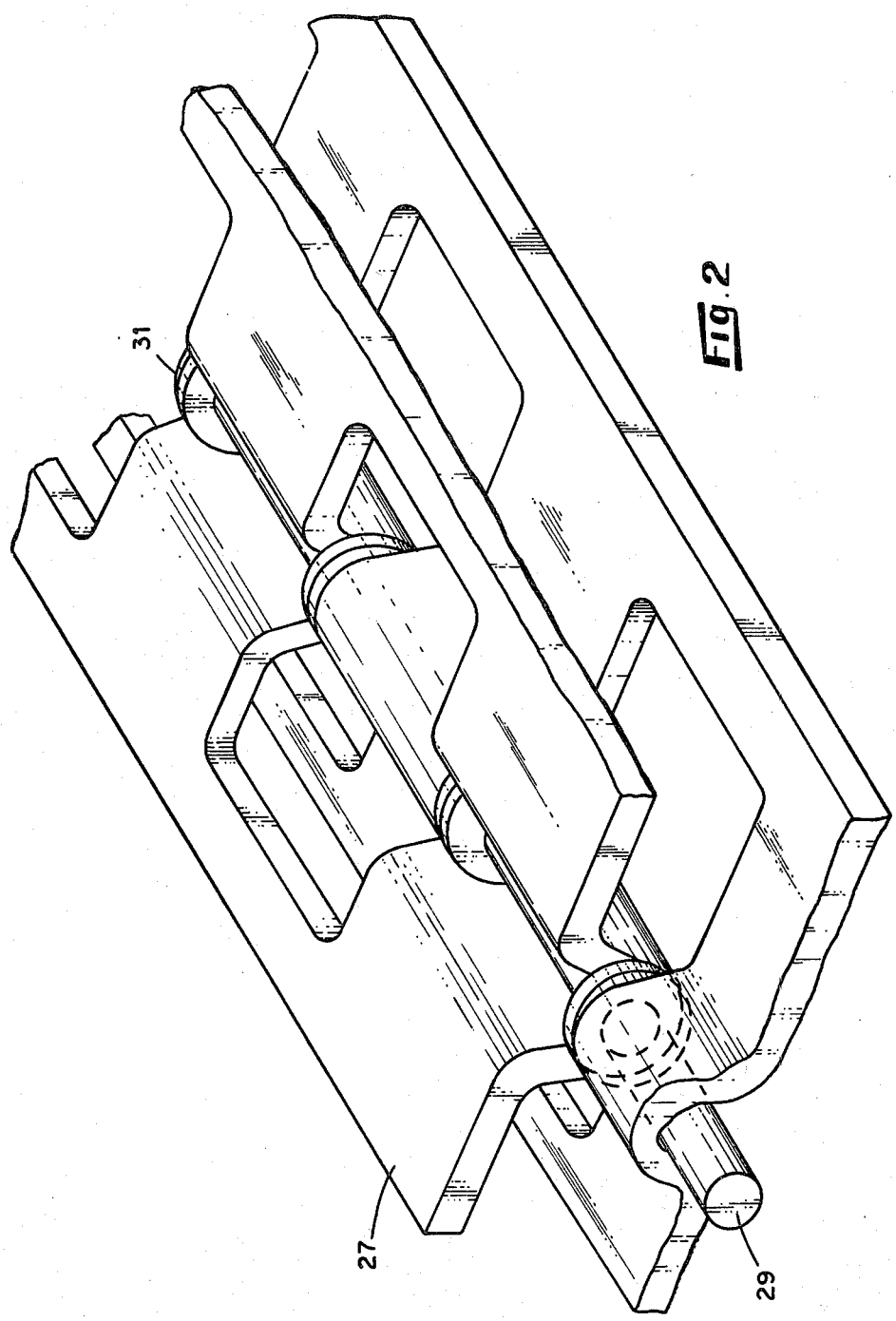
FIG. 2 is a perspective view of a stack fastener (compression springs not shown) suitable for temporarily compressing a short fuel cell.

FIG. 2 shows a perspective view of a hinge clamp used as a fastener for compressing fuel cell stack 1. Hinge clamp 27 may be made of stainless steel or other suitable corrosion resistant material. The thickness of clamp 27 is slightly less than the height of recess 35 shown in FIG. 1. Thus the cooling gas can flow through channels 19 (FIG. 1) without clamp 27 impeding the cooling flow. This is shown in FIG. 4. Hinge pin or rod 29, compression spring holder (FIG. 3, No. 32) and washers 31 located between the hinges are made of electrical insulating material. This enables the positioning and electrical testing of five cell stack 1 between an upper and lower electrode (not shown) without electrically shorting stack 1.

Figure 3:
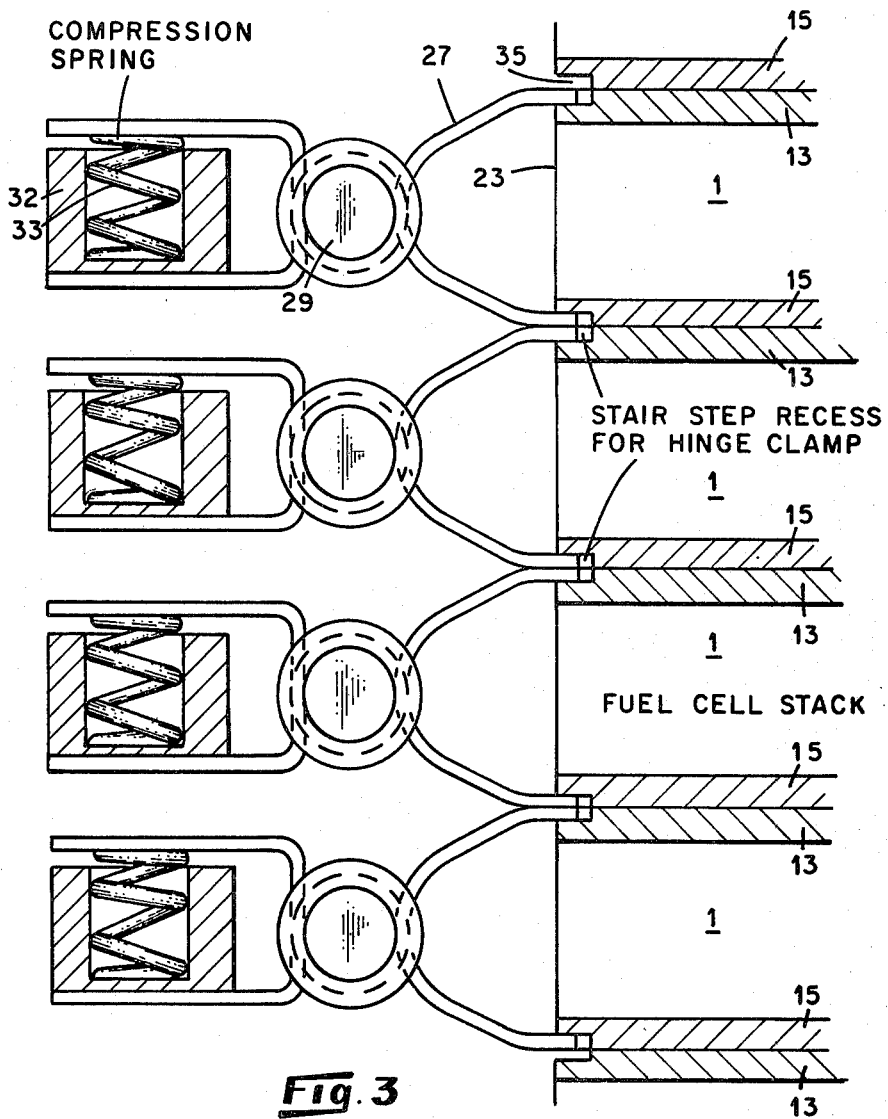
FIG. 3 is a cross-sectional view through a plurality of fasteners (compression strings shown) and assembled short fuel cell stacks.
Figure 4:
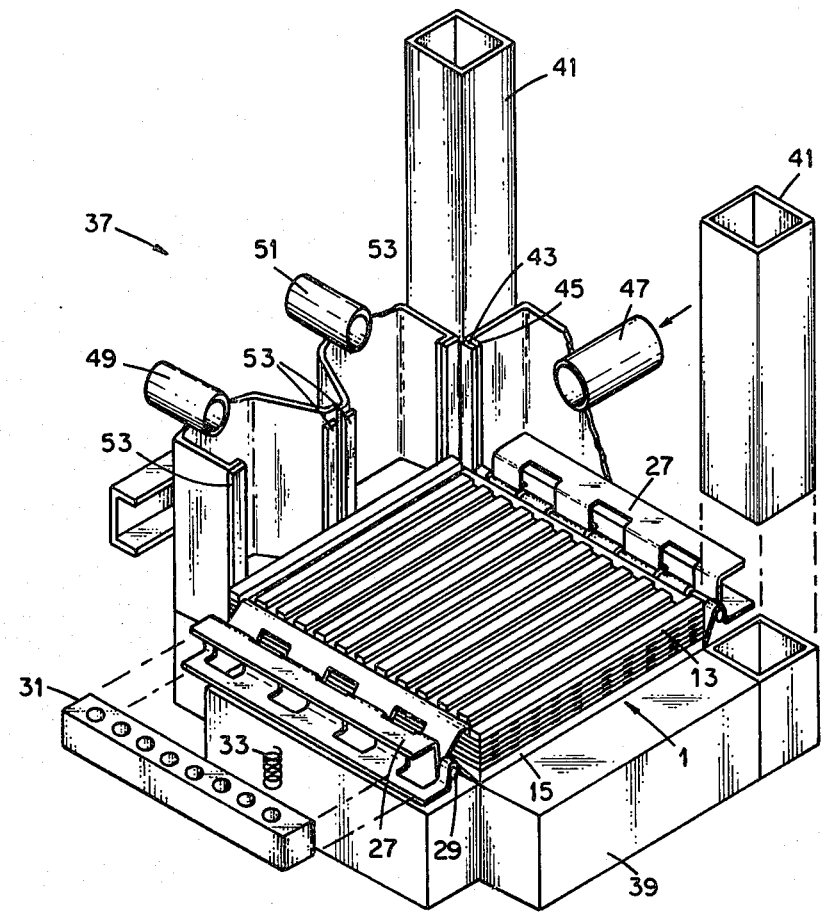
FIG. 4 is a perspective view of the lowest single assembled short fuel cell stack positioned in the base of a tall stack enclosure.

FIG. 3 is a cross-sectional view of an assembly of a plurality of fuel cell stacks 1 temporarily compressed by means of hinge clamp 27. Upper and lower bipolar cooling plates 13 and 15, respectively are engaged at recesses 35 by clamps 27. Compression springs 33 held in place by compression spring holders 32 cause clamps 27 to hold each individual fuel cell stack 1 in place making it possible to handle, test, and machine stacks 1. While FIG. 3 shows only one edge 23 of the bipolar cooling plates 13 and 15, respectively. It should be understood that in a preferred embodiment of the present invention opposite edge 21 (see FIG. 1) is also secured by a second clamp similar to clamp 27. In addition, it should be understood that clamp 27 is merely illustrative of a fastening means utilized in the present invention and any conventional means for securing stacks 1 may be utilized.

FIG. 4 illustrates in perspective view a method of assembling and pretesting a fuel cell stack according to the present invention. An enclosure stand 37 comprising base 39, movable cooling means 47, four corner posts 41 (only two shown), fuel inlet means 49 and air outlet means 51 is utilized to align and assemble a plurality of short fuel cell stacks 1 into a tall fuel cell stack. In a preferred embodiment of the present invention only three of the four corner post (41) are rigidly attached to base 39. The remaining post is fastened to base 39 with screws enabling removal of this post in order to make piling and registering of the stacks 1 easier. Once the plurality of stacks 1 have been assembled, removable corner post 41 (not shown) is fastened to base 39 of enclosure stand 37 and the tall cell stack is ready for final assembly.

While not shown in FIG. 4, the "U" shaped gas flow channels follow a letter "Z" path through the stack 1. As a result of this "Z" flow path, the fuel gas enters into fuel inlet means 49 and air exists from outlet means 51. This "Z" path design enables one to obtain a more uniform temperature distribution during the reaction process.

Figure 5:
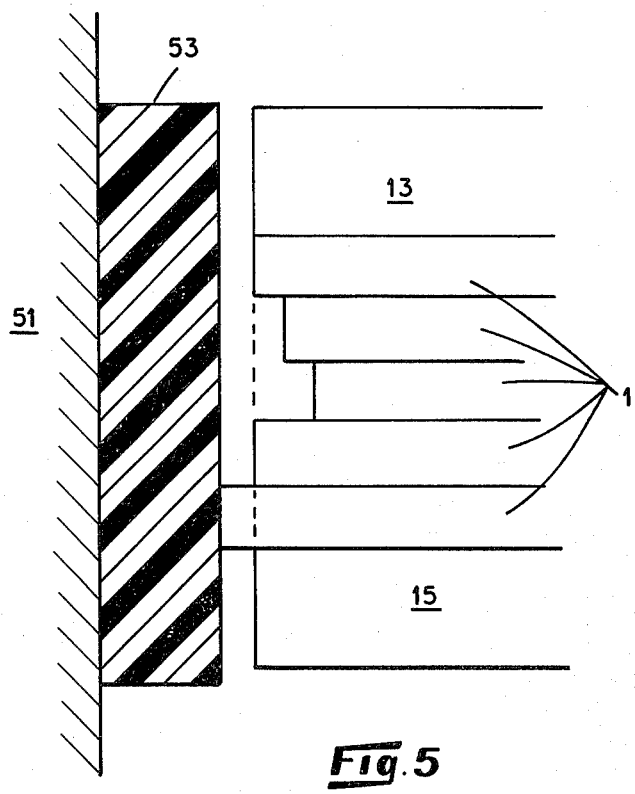
FIG. 5 is a cross-sectional view through a single short fuel cell stack, the interposed seal (gasket) and the manifold.

The surface edges of short fuel cell stack 1, preferably, should be smooth or planer. However, because bipolar cooling plates 13 and 15, respectively, are made by molding at elevated temperature and shrink upon cooling the edges are not planer. FIG. 5 is a cross-sectional view through five-cell stack 1, and the dimensional variation in the fuel cells of stack 1 and bipolar cooling plates 13 and 15 have been exaggerated to illustrate this problem. To minimize this problem, the critical surface edge may be machined to provide a substantial planar surface which enables effective sealing of the reactant gases from each other. Machining of stack 1 is accomplished by holding stack 1 together by means of clamps 27 at opposite edges 23 and 21, respectively. The exposed edges of stack 1 through which reactant gases enter and exit are then machined (e.g. ground) to provide substantial planer surfaces. Preferably, machining is accomplished prior to the addition of electrolyte to the cells but this is not required.

The machined stack 1 is activated by adding electrolyte to the cells in any conventional manner. The activated stack 1 is electrically tested and final assembly inside enclosure stand 37 (FIG. 4) is commenced.

A plurality of five cell stack 1 including upper and lower bipolar cooling plates 13 and 15, respectively, and hinge clamps 27 are placed on base 39 of stand 37. Clamps 27 fit between coolant gaskets 43 and flanges 45 of coolant means 47. Cooling means 47 are movable attached to stand 37 enabling movement of means 47 toward and from stack 1. Fuel inlet means 49 and air outlet means 51 are provided with gaskets 53. Gaskets 53 and 43, respectively, separate the reactant gases, hydrogen and air from each other by conforming the edges of stack 1 to enclosure stand 37.

After the desired number of stack 1 are provided on stand 37 and the removable post is secured to base 39 of stand 37 an enclosure top plate (not shown) is positioned on top of the tall fuel cell stack. The tall fuel cell stack comprising a plurality of short fuel cell stacks 1 is compressed by applying pressure from a means independent of the pressure applied by clamps 27. For example, jack screws provided on the top enclosure plate may be tightened compressing the tall fuel cell stack. Once the desired pressure has been applied cooling means 47 are backed away from the edge of stacks 1 so that hinge clamps 27 can be removed. After clamps 27 are removed, cooling means 47 are repositioned to seal the edge surface of stack 1. The tall fuel cell stack is now ready for final testing prior to being placed into operation. It is, of course, understood that electrical testing may be performed by any conventional means and does not form a part of the present invention.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A bipolar cooling plate having discrete opposite edges, and means carried by the plate defining a plurality of channels extending along the surface of said plate toward said opposite edges, at least one end of said channels terminating short of the corresponding edge of said plate to define a recess for receiving a fastener.

2. The bipolar cooling plate of claim 1 wherein both ends of said channels terminate short of the corresponding edges of said plate to define recesses for receiving fasteners.

3. A fuel cell assembly comprising a plurality of single fuel cells arranged in a stack, said stack having a top face and a bottom face and juxtapositioned with said top and bottom face are corresponding upper and lower bipolar cooling plates wherein said upper and lower cooling plates have discrete opposite edges, and means carried by said plates defining a plurality of channels extending along the surface of said plate toward said opposite edges, at least one end of said channels terminating short of the corresponding edge of said plate to define a recess for receiving a fastener.

4. The fuel cell assembly of claim 3 wherein both ends of said channels terminate short of the corresponding edges of said plate to define recesses for receiving fasteners.

5. The cooling plate of claim 1 wherein said recesses form a stair-step configuration.

6. The cooling plate of claim 2 wherein said recesses form stair-step configurations along the edges of said plate.

7. The cooling plate of claim 1 wherein the surface of said plate opposite to said channel bearing surface is planar.

8. The cooling plate of claim 2 wherein the surface of said plate opposite to said channel bearing surface is planar.

9. The cooling plate of claim 1 wherein said channel comprises U-shaped grooves extending along the surface of said plate.

10. The cooling plate of claim 2 wherein said channel comprises U-shaped grooves extending along the surface of said plate.

11. The cooling plate of claim 1 wherein said recess is arranged perpendicular to said channels extending along the surface of said plate.

12. The cooling plate of claim 2 wherein said recess is arranged perpendicular to said channels extending along the surface of said plate.

13. The fuel cell assembly of claim 3 wherein said recess forms a stair-step configuration.

14. The fuel cell assembly of claim 4 wherein said recesses form stair-step configurations along the edges of said plate.

15. The fuel cell assembly of claim 3 wherein the surface of said plate opposite to said channel bearing surface is planar.

16. The fuel cell assembly of claim 4 wherein the surface of said plate opposite to said channel bearing surface is planar.

17. The fuel cell assembly of claim 3 wherein said channel comprises U-shaped grooves extending along the surface of said plate.

18. The fuel cell assembly of claim 4 wherein said channel comprises U-shaped grooves extending along the surface of said plate.

19. The fuel cell assembly of claim 3 wherein said recess is arranged perpendicular to said channels extending along the surface of said plate.

20. The fuel cell assembly of claim 4 wherein said recess is arranged perpendicular to said channels extending along the surface of said plate.

* * * * *